United States Patent
Holm et al.

(10) Patent No.: US 9,369,291 B2
(45) Date of Patent: Jun. 14, 2016

(54) HANDLING COMMUNICATION SESSIONS IN A COMMUNICATIONS NETWORK

(75) Inventors: Jan Holm, Gävle (SE); Susana Fernandez Alonso, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 199 days.

(21) Appl. No.: 13/820,854

(22) PCT Filed: May 9, 2012

(86) PCT No.: PCT/EP2012/058505
§ 371 (c)(1),
(2), (4) Date: Mar. 5, 2013

(87) PCT Pub. No.: WO2013/167178
PCT Pub. Date: Nov. 14, 2013

(65) Prior Publication Data
US 2014/0185490 A1  Jul. 3, 2014

(51) Int. Cl.
*H04L 12/14* (2006.01)
*H04L 29/06* (2006.01)
(Continued)

(52) U.S. Cl.
CPC ........ *H04L 12/1407* (2013.01); *H04L 41/0893* (2013.01); *H04L 65/1016* (2013.01); *H04L 65/1069* (2013.01); *H04L 65/1073* (2013.01); *H04W 4/22* (2013.01); *H04L 65/1006* (2013.01); *H04L 65/1046* (2013.01); *H04L 67/141* (2013.01); *H04W 48/20* (2013.01); *H04W 60/00* (2013.01); *H04W 76/007* (2013.01)

(58) Field of Classification Search
CPC .. H04M 3/567; H04M 3/561; H04L 12/1407; H04L 65/1016; H04L 67/141; H04L 65/1046; H04L 65/1006; H04L 65/1069; H04L 65/1073; H04L 41/0893; H04W 76/007; H04W 48/20; H04W 60/00; H04W 4/22
See application file for complete search history.

(56) References Cited

U.S. PATENT DOCUMENTS 8,526,408 B2 * 9/2013 Zhang et al. ................... 370/338
8,537,822 B2 * 9/2013 Montemurro et al. ......... 370/392
(Continued)

OTHER PUBLICATIONS

International Search Report and Written Opinion for PCT/EP2012/058505 mailed Feb. 6, 2013, 12 pages.
(Continued)

*Primary Examiner* — Alpus H Hsu
*Assistant Examiner* — Anthony Luo
(74) *Attorney, Agent, or Firm* — Withrow & Terranova, PLLC

(57) ABSTRACT

A method and apparatus for handling a communication session in a communications network. An Application Function node receives a request to register a user terminal in the communication network. The Application Function identifies an Access Point used by the terminal to register with the network, and send a request message to a Policy and Charging Register Function (PCRF). The request message includes an Access Point Name identifying an Access Point used by the user terminal. The AF receives a response message from the PCRF, including an indicator indicating whether the Access Point is an Emergency-Access Point. The AF subsequently receives a message from the user terminal that identifies a non-emergency terminating node. If the indicator indicates that the Access Point is not an Emergency-Access Point, the AF allows the communication session. If the indicator indicates that the Access Point is an Emergency-Access Point, then the AF rejects the communication session.

5 Claims, 5 Drawing Sheets

(51) Int. Cl.
*H04L 29/08* (2006.01)
*H04W 76/00* (2009.01)
*H04L 12/24* (2006.01)
*H04W 48/20* (2009.01)
*H04W 60/00* (2009.01)
*H04W 4/22* (2009.01)

(56) References Cited

U.S. PATENT DOCUMENTS

2005/0054342 A1* 3/2005 Otsuka .................. 455/426.2
2010/0014508 A1* 1/2010 Yang ..................... 455/404.1
2011/0211574 A1* 9/2011 Li et al. ................. 370/352
2013/0094405 A1* 4/2013 Vrbaski et al. ........ 370/259

OTHER PUBLICATIONS

"3rd Generation Partnership Project; Technical Specification Group Services and System Aspects; Support for Internet Protocol (IP) based IP Multimedia Subsystem (IMS) Emergency calls over General Packet Radio Service (GPRS) and Evolved Packet Service (EPS) (Release 9)," 3GPP TR 23.869 V9.0.0, Mar. 2009, 36 pages.

"3rd Generation Partnership Project; Technical Specification Group Services and System Aspects; Policy and charging control architecture (Release 10)," 3GPP TS 23.203 V10.5.0, Dec. 2011, 132 pages.

"3rd Generation Partnership Project; Technical Specification Group Services and System Aspects; Policy and charging control architecture (Release 11)," 3GPP TS 23.203 V11.1.0, Mar. 2011, 136 pages.

"3rd Generation Partnership Project; Technical Specification Group Core Network and Terminals; IP multimedia call control protocol based on Session Initiation Protocol (SIP) and Session Description Protocol (SDP); Stage 3 (Release 11)," 3GPP TS 24.229 V11.3.0, Mar. 2012, 728 pages.

"3rd Generation Partnership Project; Technical Specification Group Core Network and Terminals; Policy and Charging Control signalling flows and Quality of Service (QoS) parameter mapping (Release 11)," 3GPP TS 29.213 V11.2.0, Mar. 2012, 160 pages.

* cited by examiner

HANDLING COMMUNICATION SESSIONS IN A COMMUNICATIONS NETWORK

This application is a 35 U.S.C. §371 national phase filing of International Application No. PCT/EP2012/058505, filed May 9, 2012, the disclosure of which is incorporated herein by reference in its entirety.

TECHNICAL FIELD

The invention relates to the field of handling communication sessions in a communications network.

BACKGROUND

3rd Generation Partnership Project (3GPP) uses Policy and Charging Control (PCC) functionality to control policy and charging rules in a communication network. FIG. 1, adapted from 3GPP TS 23.203, illustrates PCC functionality in an Evolved 3GPP Packet Switched domain. A Policy Control and Charging Rules Function (PCR) 1 is a functional element that is used for policy control decision and flow based charging control functionalities. The PCRF 1 provides network control regarding service data flow detection, gating, Quality of Service (QoS) and flow based charging (except credit management) towards a Policy and Charging Enforcement Function (PCEF) 2. The PCRF 1 receives session and media related information from an Application Function (AF) 3 and informs AF 3 of traffic plane events.

The PCRF 1 provisions PCC Rules to the PCEF 2 via a Gx reference point and may provision QoS Rules to a Bearer Binding and Event Reporting Function (BBERF) 4 via a Gxx reference point for deployments based on PMIP/DSMIP protocols in the core network.

The PCRF 1 uses PCRF policy decisions to inform the PCEF 2 of PCC rules on the treatment of each service data flow under PCC control. The PCRF 1 communicates with a Subscription Profile Repository (SPR) 5 via a Sp reference point.

The PCEF 2 is responsible for service data flow detection based on filters and definitions included in the PCC rules provisioned by the PCRF 1. The PCEF is also responsible for online and offline charging interactions and policy enforcement. It communicates with an Online Charging System (OCS) 6, which handles service data flow based credit control 7, via a Gy reference point. The PCEF 2 communicates with an Offline Charging System (OFCS) 8 via a Gz reference point. The PCEF 2 is typically located at a gateway 9.

The AF 3 is a functional entity that handles applications in which service is delivered in a different layer (typically the transport layer) from the layer in which the service has been requested (typically the signalling layer). An example of an AF 3 is a Proxy-Call Session Control Function (P-CSCF) in an IP Multimedia Subsystem (IMS) Core Network (CN). The AF 3 communicates with the PCRF 1 via an Rx interface to transfer dynamic session information describing the media to be delivered in the transport layer.

For dynamic services such as Multimedia telephony (MMTel) and Voice over LTE (VoLTE), the PCRF 1 decides the required quality of the media to be allocated for the media (the media may be, for example, voice, video, instant messaging, picture sharing, white board, and so on). This results in the establishment of dedicated bearer(s) with a guaranteed bit rate (GBR) or non guaranteed bit rate (non GBR), and also affects packet forwarding treatment in the Radio Access Network (RAN) by means of determining a QoS Class Identifier (QCI).

The PCRF 1 determines at the packet core control plane if a bearer to be established and maintained has priority over other bearers for the same or different users. Allocation and retention priority information (ARP) is provided, which contains a level of priority (i.e. how important the bearer is compared to other bearers) and a pre-emption capability and vulnerability (i.e. whether a bearer with lower priority is allowed to be torn down in favour of a bearer with higher priority).

When an AF 3 detects that a user initiates or receives a request to establish a communication session such as a voice call, it may interact with the PCRF 1 to provide service information (e.g. MMTel service) and Service Data Flows (SDFs). This leads to the provision of the SDFs and the decided QoS information (ARP/QCI) in the PCEF 2. The PCEF 2 determines whether an existing bearer can be used for the SDFs by determining if a bearer already exists with the same ARP/QCI value, or if a new bearer is to be established. If a new bearer is to be established, the value of the ARP reflects how important the new bearer is in relation to other bearers at the packet core network (IP CAN bearers) and the Radio Access Network (RAN).

Turning now to FIG. 2, there is shown a signalling diagram to establish an IMS call between User A 10 and User B 11. User A's 10 home network includes a PCEF 12, a PCRF 13 and an AF 14, and User B's home network also includes a PCEF 15, a PCRF 16 and an AF 17. The following numbering corresponds to that of FIG. 2:

S1. User A 10 sends a SIP INVITE to the AF 14 to establish a voice call with User B 11. The SIP INVITE includes an SDP offer that indicates a voice call is requested, and includes codecs that User A's terminal can use.

S2-S3. The SIP INVITE is sent to User B 10.

S4-S6. User B 10 is alerted to the SIP INVITE and a SIP 180 is sent to User A 10 to initiate a ringing tone at User A's terminal.

S7-S9. User B 10 answers to accept the communication session. A SIP 200 OK is sent towards User A 10 that includes a SDP answer indicating User B's terminal preferred codecs (selected from those offered by user A) to be used for the audio.

S10-S11. AF 14 requests audio resources for User A 10 and AF 17 requests audio resources for User B 11.

S12-S15. Both AFs 14, 17 establish an AF session for the service by sending an Rx-AAR to the respective Users. The AAR includes an application identifier (e.g. IMS voice), the codecs negotiated by the terminals (taken from the SDP answer) and the flow information (to allow IP traffic and media streaming from User A to User B and from User B to User A).

S16-S21. Both AFs 14, 17 determine the quality of service (QoS) and charging required based on the information received from each AF 14, 17 and the subscription data for the respective Users 10, 11. As a result, the PCC rules containing the allowed SDFs, the associated QoS and the charging information are sent to the respective PCEFs 12, 15.

S22, S23. Dedicated bearers for the voice call with the required QoS are established between PCEF 12 and User A 10, and between PCEF 15 and User B 11. S24. The voice call now proceeds between User A 10 and User B 11.

3GPP Release 9 specifies the provision of emergency services communications in an IMS network. Emergency services are services provided through an emergency Access Point Name (APN) and do not require subscription control. When a PCRF 1 detects that an emergency service session is being established, the session is prioritized in the network by providing a relevant QCI and ARP. According to existing procedures, the PCRF 1 also checks that the emergency connection is not being used in a fraudulent way. This is achieved by checking that the service-URN provided in steps S12 and S13 described above is an emergency service APN.

Where the AF 3 is a P-CSCF, it implements some fraud control mechanisms in order to prevent a user who has initiated an emergency registration from initiating a non-emergency call using that registration. In this case, when the P-CSCF 3 detects that a Request-URI provided by User Equipment (UE) does not match any of the emergency service identifiers stored in the P-CSCF, it will reject the request.

However, it is possible for a fraudulent user to initiate a registration using an emergency APN, but then to use that registration to fraudulently make on-emergency calls, thereby avoiding the usual call charges that a non-emergency call would incur. In this case, when the user initiates a non-emergency call, the P-CSCF 3 fraud procedures do not detect anything abnormal. A mechanism exists whereby, when the P-CSCF 3 contacts the PCRF 1, the PCRF 1 checks whether the APN is an emergency APN. If this is the case and the service that the user tries to use is not an emergency service (Service-URN over Rx does not correspond to an emergency service) the PCRF 1 prevents the user from using the service. In this case the P-CSCF 3 is also expected to reject the request towards the UE. This procedure delegates the control of fraud situations to the packet network domain, instead of in the IMS network, creating unnecessary signalling. Furthermore, the procedure creates an additional processing load at the PCRF 1 since the PCRF 1, which is configured with a list of emergency APNs, must check the APN related to the IP address provided over Rx and check that it corresponds to an emergency APN. This must to be done in all Rx requests for the sole purpose to identify possible faulty UEs in the IMS network.

An alternative procedure that avoids additional processing at the PCRF is to configure a list of IP addresses related to emergency APNs at each P-CSCF. However, this would require extra configuration in all P-CSCFs just to identify fraudulent UEs, which could be a costly and time-consuming exercise, especially when an IP address identifying an emergency APN changes.

Furthermore, the procedure does not prevent a fraudulent user from using SIP messages that never result in an action over the Rx interface. Examples of such messages include SIP SUBSCRIBE request and SIP MESSAGE. In this case the fraudulent user can use the emergency bearer without the P-CSCF 3 detecting that this is a fraudulent use of the emergency bearer. This can lead to an overloaded network and potentially prevent non-fraudulent users from using emergency services.

SUMMARY

It is an object of the invention to provide a mechanism to prevent fraudulent use of emergency registrations in a communication network. According to a first aspect, there is provided a method of handling a communication session in a communications network. An Application Function (AF) node receives from a user terminal a request to register a user terminal in the communication network. The AF identifies an Access Point used by the terminal to register with the network, and send a request message to a Policy and Charging Register Function (PCRF). The request message includes an Access Point Name (APN) identifying an Access Point used by the user terminal. The AF receives a response message from the PCRF, the response message including an indicator indicating whether the Access Point is an Emergency-Access Point. The AF subsequently receives a message from the user terminal to establish a communication session with a terminating node. The message identifies a non-emergency terminating node. If the indicator indicates that the Access Point is not an Emergency-Access Point, then the AF allows the establishment of the communication session. However, if the indicator indicates that the Access Point is an Emergency-Access Point, then the AF rejects the establishment of the communication session. This ensures that user terminals cannot use an emergency registration to establish a non-emergency communication session without the need for the AF to contact the PCRF each time a new message establishing a communication (such as a stand-alone or dialog-establishing message) is received. The amount of signalling between the AF and the PCRF is therefore reduced, as is the processing burden on the PCRF.

An example of an AF node is a Proxy-Call Session Control Function (P-CSCF).

The message received from the user terminal is optionally a dialog-establishing message or a stand-alone message selected from any of a SIP INVITE, a SIP MESSAGE, a SIP OPTIONS and a SIP SUBSCRIBE message. The message optionally identifies a non-emergency terminating node using a Request-URI.

As an option, the AF stores the indicator indicating whether the Access Point is an Emergency-Access Point.

As an option, the response message includes an indicator indicating that the Access Point is an Emergency-Access Point. The absence of an indicator is used by the AF to determine that the Access Point is not an Emergency-Access Point.

According to a second aspect, there is provided an AF node for use in a communications network. The AF node is provided with a first receiver for receiving from a user terminal a request to register the user terminal in the communication network. A first transmitter is provided for sending a request message to a PCRF. The request message includes an APN identifying an Access Point used by the user terminal. A second receiver is provided for receiving a response message from the PCRF. The response message includes an indicator indicating whether the Access Point is an Emergency-Access Point. A third receiver is provided for receiving from the user terminal an message to establish a communication session with a terminating node, the message identifying a non-emergency terminating node. A processor is provided, the processor being arranged to determine whether the indicator indicates that the Access Point is an Emergency-Access Point. If the indicator indicates that the Access Point is not an Emergency-Access Point, then the establishment of the communication session is allowed. If the indicator indicates that the Access Point is an Emergency-Access Point, then the communication session is rejected. The AF therefore prevents a user terminal from using an emergency registration to establish a non-emergency communication session without needing to contact the PCRF each time the AF receives a dialog establishing or stand-alone message to establish a communication session.

As an option, the AF node is a P-CSCF node.

The AF node is optionally provided with a memory for storing the indicator indicating whether the Access Point is an Emergency-Access Point.

According to a third aspect, there is provided a PCRF node for use in a communications network. The PCRF node is provided with a receiver for receiving from an AF node a request message. The request message includes an APN identifying an Access Point used by a user terminal to register with the AF node. A transmitter is also provided for sending a response message to the AF node, the response message including an indicator indicating whether the Access Point is an Emergency-Access Point. By sending an indicator, the AF does not need to contact the PCRF each time it receives a dialog establishing message or stand-alone message, thereby reducing signalling and reducing the processing burden on the PCRF.

According to a fourth aspect, there is provided a method of operating a computer apparatus. The method comprises receiving a request message from an AF node, the request message including an APN identifying an Access Point used by a user terminal to register with the AF node. A response message is sent to the AF node, the response message including an indicator indicating whether the Access Point is an Emergency-Access Point.

According to a fifth aspect, there is provided a computer program comprising computer readable code means which, when run on a computer apparatus, causes the computer apparatus to perform the method as describes above in either of the first aspect or the fourth aspect.

According to a sixth aspect, there is provided a computer program product comprising a computer readable medium and a computer program as described above in the fifth aspect. The computer program is stored on the computer readable medium.

DETAILED DESCRIPTION

One way to prevent fraudulent use of an emergency registration is to contact the PCRF each time a user terminal attempts to establish a communication session. The PCRF determines whether the user terminal is fraudulently attempting to establish a non-emergency communication session using an emergency registration. However, this places a processing burden on the PCRF and leads to a great deal of signalling. It has been realised that the amount of signalling can be greatly reduced if the AF is used to detect whether or not the user terminal is attempting to establish a non-emergency communication session using an emergency registration.

The procedures described below may be implemented in different types of network. By way of illustration, the procedures are described in the context of an IMS network. In this case, the AF functionality is performed by a P-CSCF, and the user terminal is User Equipment (UE). It will be appreciated that different nodes might have the same functionality, and these nodes are mentioned by way of example only.

The procedures described below rely on letting the P-CSCF know if an APN used by the UE to register in the network is an emergency-APN or not during a SIP Registration procedure.

Figure 1:
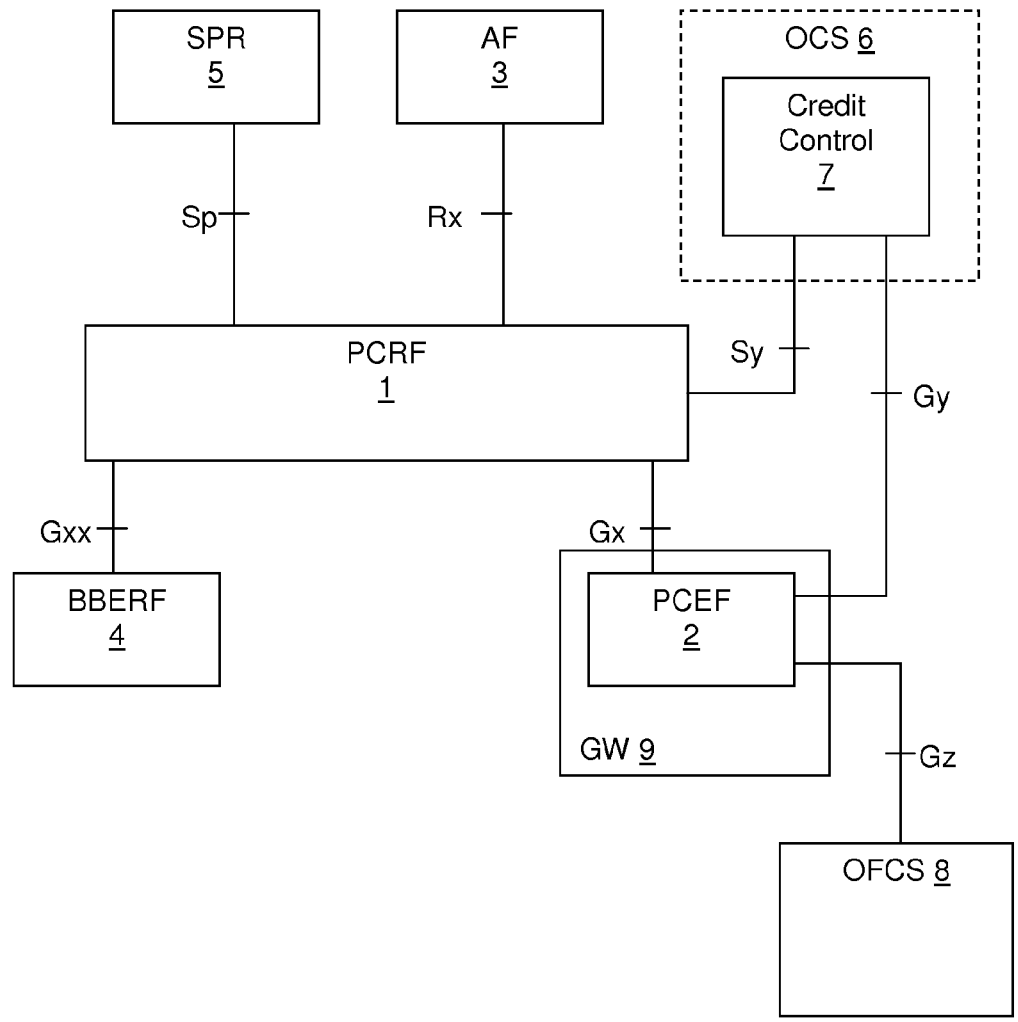
FIG. 1 illustrates schematically in a block diagram Policy and Charging Control functionality in an Evolved 3GPP Packet Switched domain.
Figure 2:
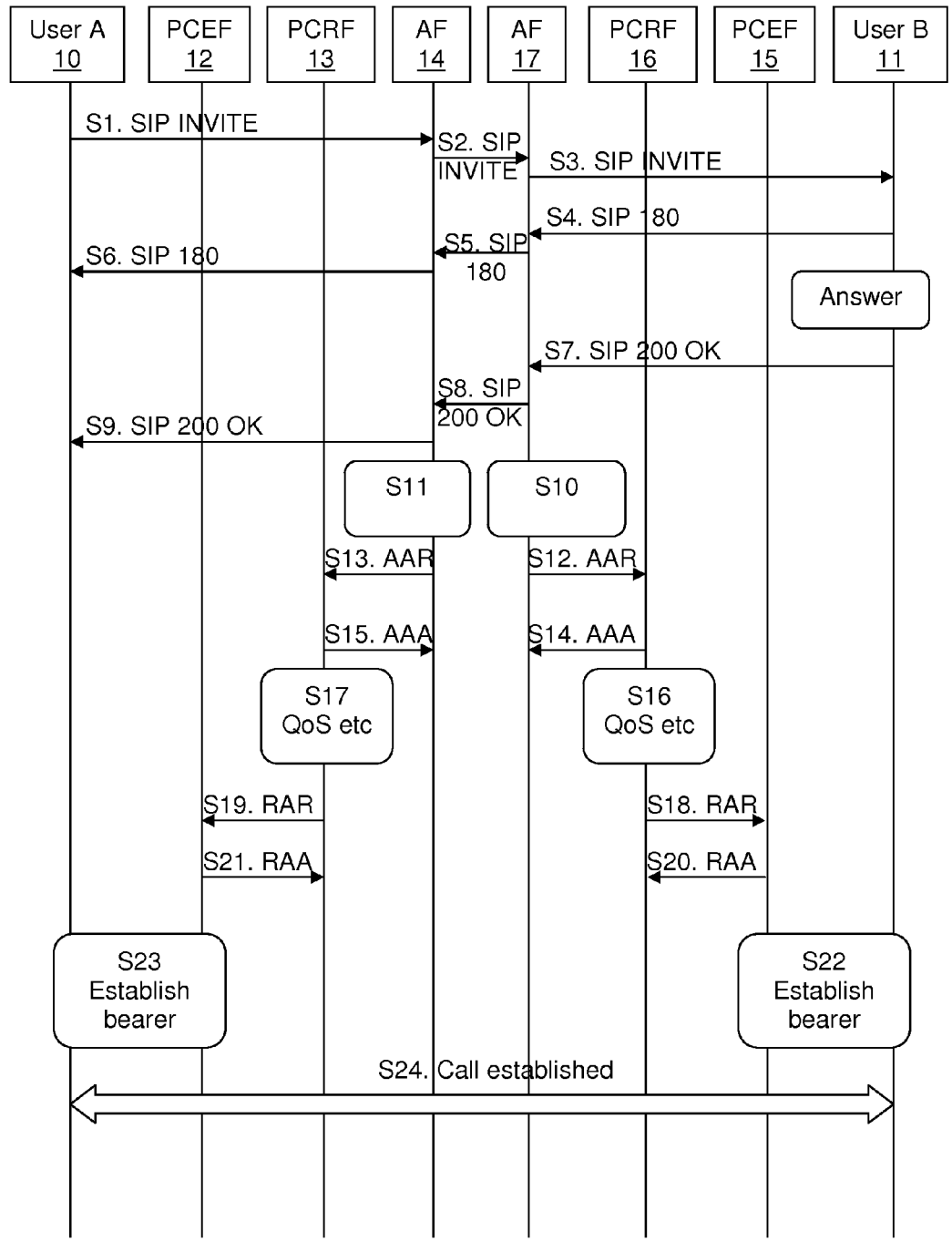
FIG. 2 is a signalling diagram illustrating exemplary steps in establishing a voice call in an IMS communications network.
Figure 3:
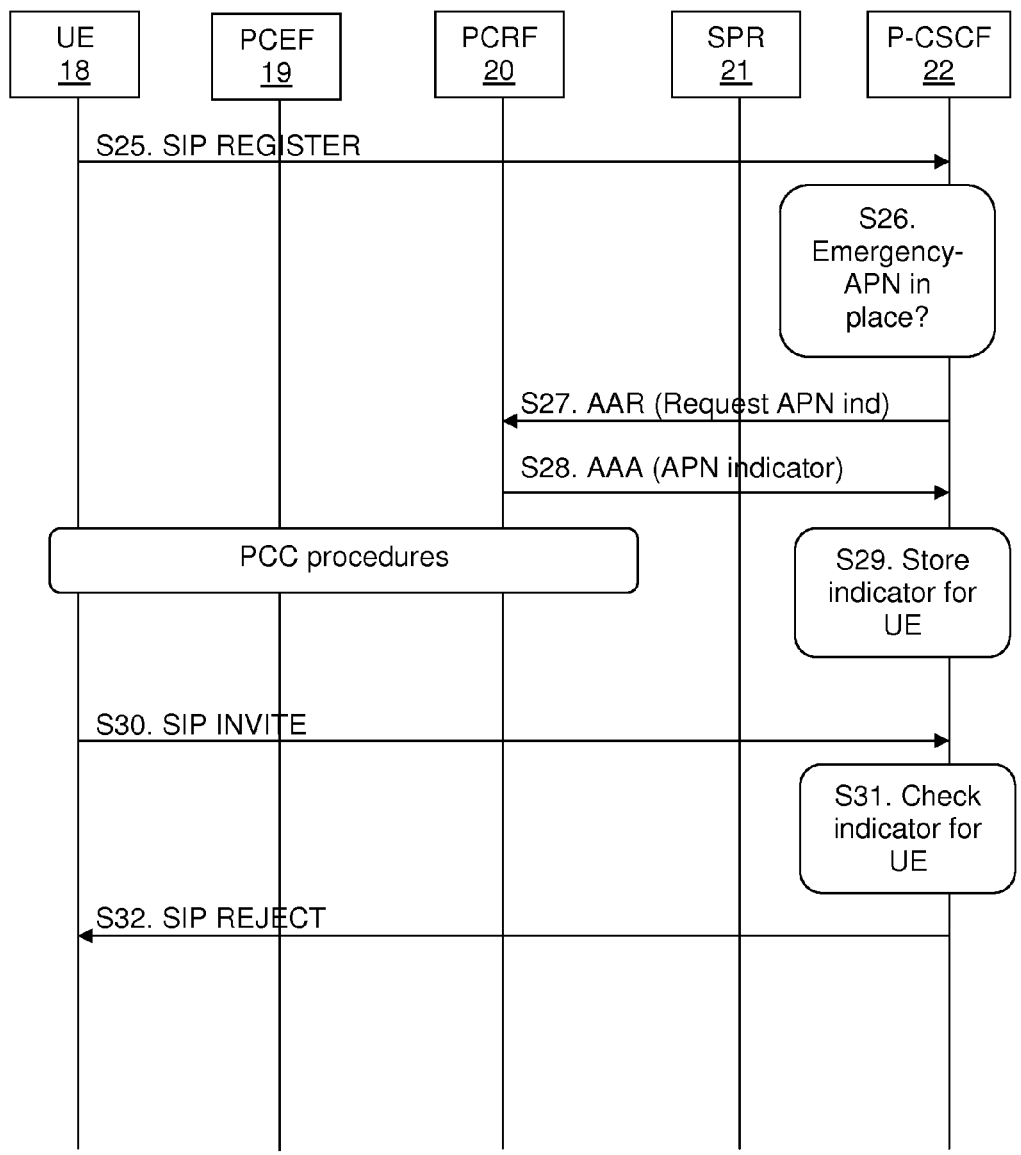
FIG. 3 is a signalling diagram illustrating exemplary steps in establishing a communication session in a communications network according to an embodiment of the invention.

Turning to FIG. 3, there is illustrated a UE 18, a PCEF 19, a PCRF 20, an SPR 21 and an AF (in this case, a P-CSCF) 22. When the P-CSCF 22 receives a SIP REGISTER request from the UE 18, it contacts the PCRF 20 using normal procedures in order to subscribe to IP-CAN type. The P-CSCF 22 also requests as to whether the APN used by the UE 18 to register with the network is relates to an emergency APN.

The PCRF 20 is aware that the APN is an emergency APN during the IP-CAN session establishment. This information is stored as part of the IP-CAN session information. When the PCRF 20 is contacted by the P-CSCF 22, it determines whether the APN is an Emergency-APN. If so, the PCRF 20 replies to the P-CSCF 22 with an indication that the APN relates to an Emergency-APN. The P-CSCF 22 stores the indication as part of that UE 18 registration information.

The P-CSCF 22 subsequently receives a request from the UE to set up a session with another terminal. This request may be in the form of, or example, a SIP SUBSCRIBE request, a SIP INVITE, a SIP MESSAGE request, a SIP OPTIONS or any other dialog creating or stand-alone SIP request. This request includes a Request-URI identifying the other terminal. If the Emergency-APN indicator is set, the P-CSCF 22 checks if the Request-URI corresponds to an emergency service. If not, the P-CSCF 22 rejects the procedure without contacting the PCRF 20. This greatly reduces the signalling compared to a procedure in which the P-CSCF 22 would need to contact the PCRF 20 each time a session is requested by the UE 18.

The following numbering corresponds to that of FIG. 3:

S25. The UE 18 registers in the IMS network. There is no indication that this registration is an emergency registration. The registration request is sent to the P-CSCF 22.

S26. The P-CSCF 22 needs to determine whether the UE 18 has registered using an emergency registration.

S27. The P-CSCF 22 sends a Diameter AAR command to the PCRF 20 using normal procedures to subscribe to specific actions such as an IP-CAN type change. The P-CSCF 22 additionally indicates that it wants to know whether the APN used to register is an Emergency-APN.

S28. The PCRF 20 determines whether the APN is an emergency APN and sets an indicator. If the APN is an Emergency-APN, the PCRF 20 includes an "Emergency-APN" indicator in the AAA response.

S29. The P-CSCF 22 stores the indicator as part of the registration information for that UE 18. Furthermore, standard PCC procedures take place (e.g. the PCRF 20 subscribes to IP-CAN-Type change in the packet network).

S30. The UE initiates a SIP INVITE (or other SIP method) request including a Request-URI for the terminating terminal.

S31. If the Request-URI does not relate to an emergency service, the P-CSCF 22 checks whether the Emergency-APN indicator is set for the UE 18. If the Emergency-APN indicator is set for the UE 18, the request is rejected (step S32). Otherwise, normal procedures will continue. The P-CSCF 22 can easily determine if the Request-URI relates to an emergency service, as it is a requirement that Request-URI's for emergency services include specific data (such as the characters "SOS") identifying the requested service as an emergency service. The P-CSCF 22 can check for the presence of this specific data to determine whether the Request-URI relates to an emergency service.

In order to allow the P-CSCF 22 to query the APN with the PCRF when it sends the AAR command in step S27, the AAR command may be provided with a new attribute-value pair (AVP). For example, the AAR command could include an Emergency-request AVP that is an enumerated AVP with a unique value, Emergency-APN-support-required.

Similarly, a new AVP may be defined in the AAA command in step S28. For example, the AAA command could include an Emergency-Support AVP that is an enumerated AVP with a unique value, Emergency-APN-set.

Figure 4:
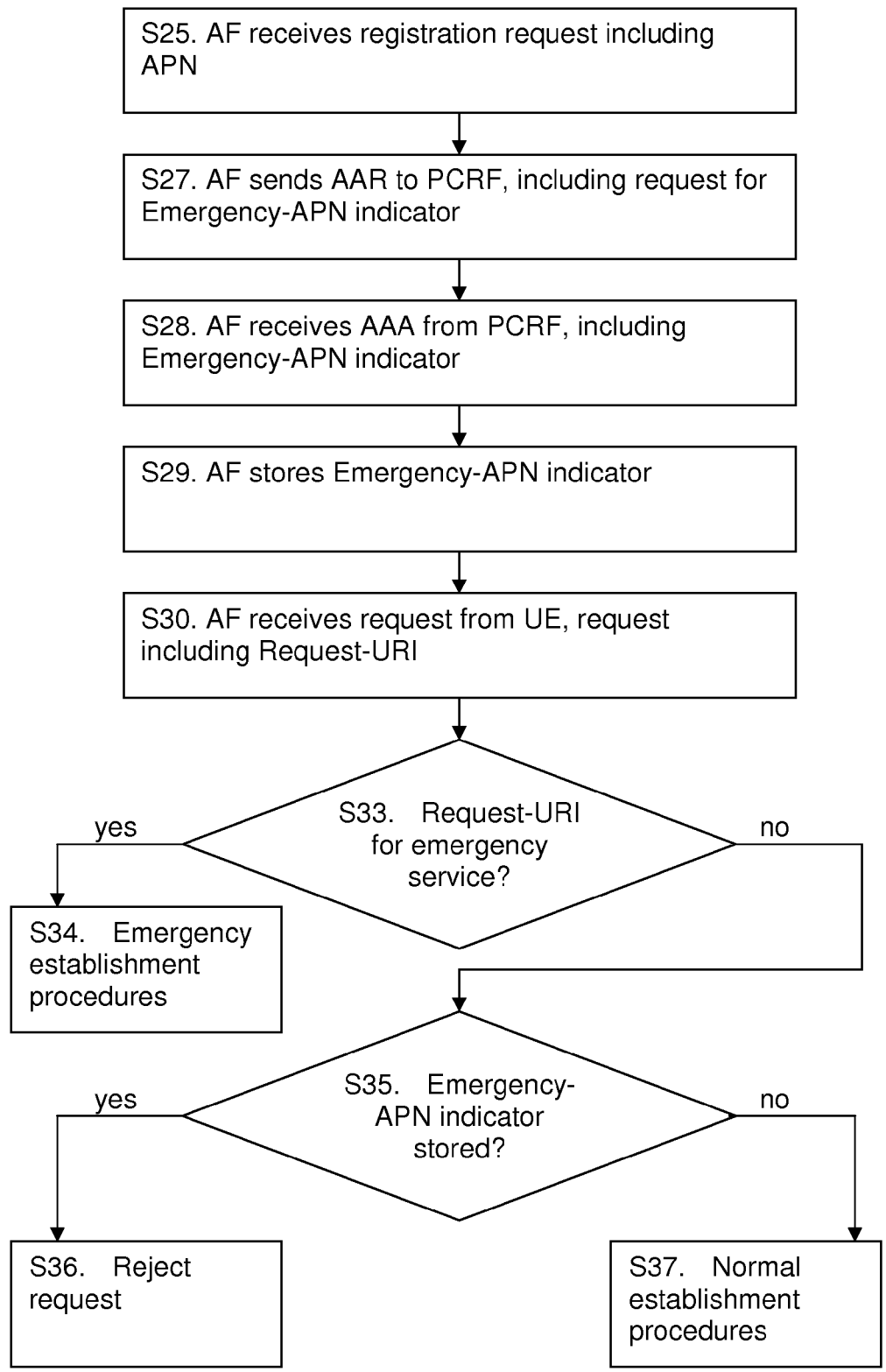
FIG. 4 is a flow diagram illustrating exemplary steps in establishing a communication session in a communications network according to an embodiment of the invention.

The steps of the invention are described in more detail in FIG. 4, with the following numbering corresponding to that of FIG. 4.

S25. The AF (a P-CSCF in the case of an IMS network) 22 receives a registration request from the user terminal (a UE in the case of an IMS network) 18. The AF can then obtain the name of the APN either because it has a one to one relationship with the APN or by looking up an IP address identifying the APN.

S26. The AF 22 sends an AAR to the PCRF 20, including a request for an Emergency-APN indicator.

S27. The PCRF 20 responds to the AF 22 in an AAA message. It may include an Emergency-APN indicator only if the user terminal is registered using an emergency APN. Alternatively, an indicator may be include that indicates whether or not the user terminal is registered using an emergency APN.

S29. The AF 22 stores the Emergency-APN indicator in a computer readable medium in the form of a memory.

S30. The AF 22 subsequently receives a request to establish a communication session with a further terminal from the user terminal 18.

S33. The AF 22 determines whether the request received in step S30 contains a Request-URI that relates to an emergency service (for example, by checking for "SOS" information in the Request-URI). If the Request-URI relates to an emergency service then the procedure continues at step S34. If the Request-URI does not relate to an emergency service then the procedure continues at step S35.

S34. As the Request-URI relates to an emergency service, then the AF 22 is aware that the user terminal 18 is legitimately attempting to contact an emergency service, and so emergency session establishment procedures are used.

S35. The Request-URI does not relate to an emergency service, and so the AF needs to determine whether the user terminal 18 has registered using an emergency APN. It therefore checks to see whether it has stored an Emergency-APN indicator for that user terminal 18 registration. If it has, then the procedure continues at step S36. If it has not, then the procedure continues at step S37.

S36. The AF 22 has determined that the user terminal 18 has registered using an emergency APN but is attempting to establish a non-emergency session with another terminal. The AF 22 therefore rejects the request, as this is considered to be fraudulent use of the emergency registration.

S37. The AF 22 has determined that the user terminal 18 has registered using a non-emergency APN and is attempting to establish a non-emergency session with another terminal. The AF 22 therefore allows normal session establishment procedures to be followed, as the user is not attempting to fraudulently use an emergency registration.

The procedures described allow the AF 22 to determine whether the user terminal 18 is fraudulently using an emergency registration. This negates the need to contact the PCRF 20 each time the user terminal 18 attempts to establish a communication session, greatly reducing the signalling required.

Figure 5:
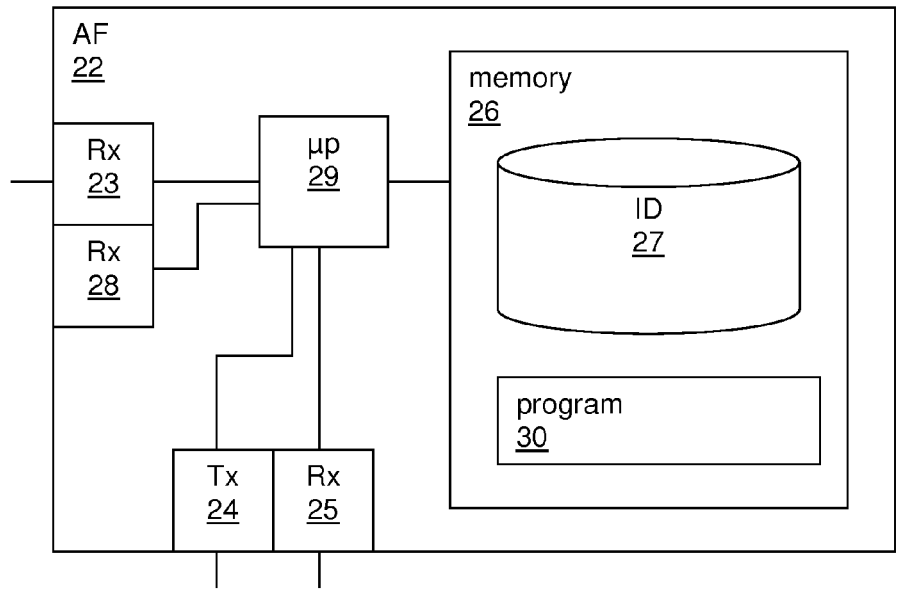
FIG. 5 illustrates schematically in a block diagram an Application Function node according to an embodiment of the invention.

Turning now to FIG. 5, there is illustrated an exemplary embodiment of an AF 22 (such as a P-CSCF) according to an embodiment of the invention. The AF 22 is provided with a first receiver 23 that receives the registration request from the user terminal 18. A transmitter 24 is provided for sending the AAR request to the PCRF 20, and a second receiver 25 is provided to receive the AAA response from the PCRF that includes the Emergency-APN indicator. A computer readable medium in the form of a memory 26 may be provided. This can be used to store Emergency-APN indicators for different user terminals in a storage area such as a database 27.

A third receiver 27 is provided for receiving a request from the user terminal 18 to establish a communication session with another node. A processor 29 is arranged to determine whether the stored Emergency-APN indicator for that user terminal 18 indicates that the user terminal 18 has registered using an emergency APN, and determine whether the request to establish a communication session is using a non-emergency Request-URI. As described above, if the user terminal 18 is attempting to establish a non-emergency communication session using an Emergency APN then the session request is rejected.

Note that the receivers 23, 25, 28 and the transmitter 24 may be embodied in one or more physical devices such as a transceiver. The memory 26 may be used to store a computer program 30 which, when executed by the processor 29, causes the AF 22 to behave as described above.

Figure 6:
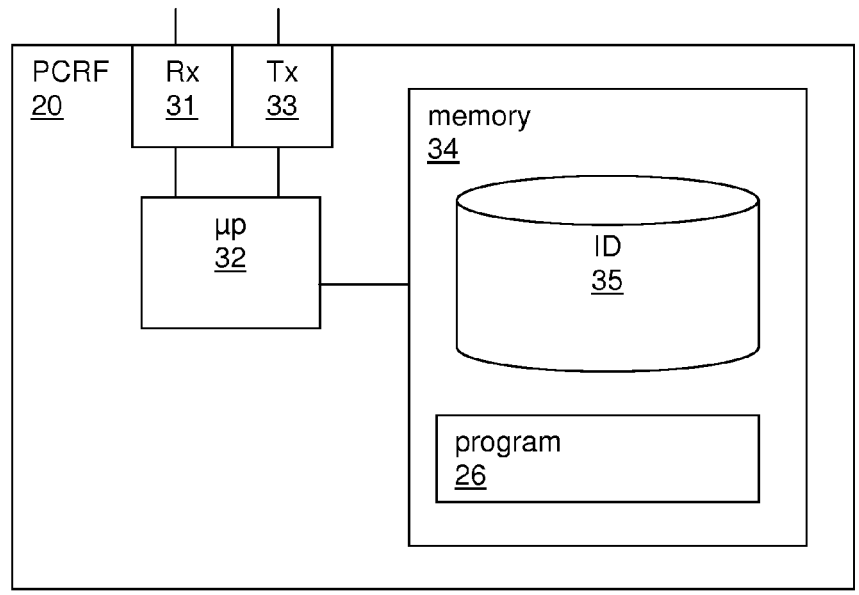
FIG. 6 illustrates schematically in a block diagram a Policy and Charging Rules Function node according to an embodiment of the invention

FIG. 6 illustrates an exemplary embodiment of a PCRF 20. The PCRF 20 is provided with a receiver 31 for receiving the AAR request message from the AF 22. A processor 32 is provided for generating a response AAA message, the AAA message including the Emergency-APN indicator if the user terminal 18 has accessed the network using an emergency APN. A transmitter 33 is provided for sending the AAA message to the AF 22. The PCRF may be provided with a memory 34 used to store in a database 35 the APNs used by user terminals for registration. The memory 34 may be used to store a computer program 26 which, when executed by the processor 32, causes the PCRF 20 to behave as described above. Note that the receiver 31 and the transmitter 23 may be embodied in one or more physical devices such as a transceiver.

The procedures described above allow the IMS network to control session establishment or rejection in the event that a user terminal is attempting to fraudulently use an emergency registration to establish a non-emergency communication session. This avoids having to contact the PCRF 20 each time a user terminal attempts to establish a communication session and removes some of the processing burden from the PCRF 20.

It will be appreciated by the person of skill in the art that various modifications may be made to the above-described embodiments without departing from the scope of the present invention. For example, the above invention is described with reference to an IMS network in which a P-CSCF performs the functions of the AF. However, it will be realised that the procedures may also be applied to other types of network.

The following acronyms have been used in the above description:
3GPP 3rd Generation Partnership Project
AAA AA-Answer
AAR AA-Request
AF Application Function
APN Access Point Name ARP Allocation Retention Priority
AVP attribute-value pair
BBERF Bearer Binding and Event Reporting Function
GBR Guaranteed bit rate
IM CN IMS Core Network
IMS IP Multimedia Subsystem
IP-CAN IP Connectivity Access Network
MMTel Mulitmedia Telephony
OCS Online Charging System
OFCS Offline Charging System
PCC Policy and Charging Control
PCEF Policy and Charging Enforcement Function
PCRF Policy and Charging Register Function
P-CSCF Proxy-Call Session Control Function
QCI QoS Class Identifier
QoS Quality of Service
RAA Re-Auth-Answer
RAN Radio Access Network
RAR Re-Auth-Request
SDF Service Data Flow
SDP Session Description Protocol
SIP Session Initiation Protocol
SPR Subscription Profile Repository
UE User Equipment
VoLTE Voice over LTE

The invention claimed is:

1. A method of handling a communication session in a communications network, the method comprising, at an Application Function node:
receiving from a user terminal a request to register the user terminal in the communication network;
sending to a Policy and Charging Register Function a request message, the request message including an Access Point Name identifying an Access Point used by the user terminal, wherein the Policy and Charging Register Function is a functional element of the communications network;
receiving a response message from the Policy and Charging Register Function, the response message including an indicator indicating whether the Access Point is an Emergency-Access Point;
storing the indicator indicating whether the Access Point is an Emergency-Access Point;
receiving from the user terminal a message to establish a communication session with a terminating node, the message identifying a non-emergency terminating node;
determining if the message identifies a non-emergency terminating node; and
if the message identifies a non-emergency terminating node: in the event that the indicator indicates that the Access Point is not an Emergency-Access Point, allowing the establishment of the communication session and, in the event that the indicator indicates that the Access Point is an Emergency-Access Point, rejecting the establishment of the communication session, thereby ensuring that the user terminal cannot use an emergency registration to establish a non-emergency communication session without the need to contact the Policy and Charging Register Function each time a new message establishing a communication is received.

2. The method according to claim 1, wherein the Application Function node is a Proxy-Call Session Control Function node.

3. The method according to claim 1, wherein the message received from the user terminal is selected from any of a SIP INVITE, a SIP MESSAGE, a SIP OPTIONS and a SIP SUBSCRIBE message, the message identifying a non-emergency terminating node using a Request-URI.

4. An Application Function node for use in a communications network, the Application Function node comprising:
a first receiver for receiving from a user terminal a request to register the user terminal in the communication network;
a first transmitter for sending to a Policy and Charging Register Function a request message, the request message including an Access Point Name identifying an Access Point used by the user terminal, wherein the Policy and Charging Register Function is a functional element of the communications network;
a second receiver for receiving a response message from the Policy and Charging Register Function, the response message including an indicator indicating whether the Access Point is an Emergency-Access Point;
a memory for storing the indicator indicating whether the Access Point is the Emergency-Access Point;
a third receiver for receiving from the user terminal a message to establish a communication session with a terminating node;
a processor arranged to determine whether the indicator indicates that the Access Point is an Emergency-Access Point and determine whether the message identifies a non-emergency terminating node and, in the event that the indicator indicates that the Access Point is not an Emergency-Access Point and the message identifies a non-emergency terminating node, allowing the establishment of the communication session and, in the event that the indicator indicates that the Access Point is an Emergency-Access Point, rejecting the establishment of the communication session, thereby ensuring that the user terminal cannot use an emergency registration to establish a non-emergency communication session without the need to contact the Policy and Charging Register Function each time a new message establishing a communication is received.

5. The Application Function node according to claim 4, wherein the Application Function node is a Proxy-Call Session Control Function node.

* * * * *